United States Patent
Koyama et al.

(10) Patent No.: US 8,915,598 B2
(45) Date of Patent: Dec. 23, 2014

(54) PROJECTOR

(75) Inventors: Mika Koyama, Matsumoto (JP);
Yasuyuki Kobayashi, Matsumoto (JP);
Nobuyuki Otsuki, Matsumoto (JP);
Kiyomasa Shirakura, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 73 days.

(21) Appl. No.: 13/480,143

(22) Filed: May 24, 2012

(65) Prior Publication Data

US 2012/0307214 A1    Dec. 6, 2012

(30) Foreign Application Priority Data

Jun. 6, 2011    (JP) ................. 2011-126118

(51) Int. Cl.
*G03B 21/14* (2006.01)
*G03B 21/18* (2006.01)
*G03B 21/16* (2006.01)
*G03B 21/20* (2006.01)
*G03B 21/28* (2006.01)

(52) U.S. Cl.
CPC ............... *G03B 21/18* (2013.01); *G03B 21/16* (2013.01); *G03B 21/2086* (2013.01); *G03B 21/28* (2013.01)
USPC .......................................... 353/122; 353/119

(58) Field of Classification Search
USPC ........................................ 353/119, 121, 122
See application file for complete search history.

(56) References Cited

U.S. PATENT DOCUMENTS

| | | | |
|---|---|---|---|
| 6,460,999 B1 | 10/2002 | Suzuki | |
| 7,093,943 B2 * | 8/2006 | Kobayashi et al. | 353/122 |
| 7,210,791 B2 | 5/2007 | Vinson et | |
| 8,033,669 B2 * | 10/2011 | Endo et al. | 353/74 |
| 2001/0005262 A1 | 6/2001 | Tsurushima | |
| 2002/0030791 A1 | 3/2002 | Ogawa | |
| 2004/0179172 A1 | 9/2004 | Kobayashi et al. | |
| 2005/0264769 A1 | 12/2005 | Kobayashi et al. | |
| 2006/0232751 A1 | 10/2006 | Kobayashi et al. | |
| 2008/0123062 A1 | 5/2008 | Morikuni | |
| 2009/0310092 A1 | 12/2009 | Seki | |
| 2013/0128240 A1 * | 5/2013 | Yoshida et al. | 353/85 |

FOREIGN PATENT DOCUMENTS

| | | |
|---|---|---|
| JP | A-11-119343 | 4/1999 |
| JP | A-2000-19636 | 1/2000 |
| JP | A-2001-75170 | 3/2001 |
| JP | A-2001-249399 | 9/2001 |
| JP | A-2002-6397 | 1/2002 |
| JP | A-2002-40326 | 2/2002 |
| JP | A-2004-279695 | 10/2004 |
| JP | A-2006-119676 | 5/2006 |
| JP | A-2007-34318 | 2/2007 |
| JP | A-2008-158495 | 7/2008 |
| JP | B2-4394420 | 10/2009 |
| JP | A-2009-300934 | 12/2009 |
| JP | A-2011-2650 | 1/2011 |

* cited by examiner

*Primary Examiner* — William C Dowling
(74) *Attorney, Agent, or Firm* — Oliff PLC

(57) ABSTRACT

A projector includes: an external case provided with an opening through which light passes; a projection system disposed within an inside space of the external case, wherein the projection system includes a reflection member having a reflection surface capable of reflecting light received from a light source device to guide the light toward the opening, and projects the light to the outside of the external case via the opening; and a detection unit which detects a foreign material existing on the optical path of the light in the area of light exit of the opening.

9 Claims, 6 Drawing Sheets

PROJECTOR

BACKGROUND

1. Technical Field

The present invention relates to a projector.

2. Related Art

A projector of a type disclosed in JP-A-2011-002650, for example, which modulates light emitted from a light source according to image information, and projects the modulated light using a reflection type image formation optical system is known.

According to the projector shown in JP-A-2011-002650, projection light reflected by an aspheric mirror converges in the vicinity of an opening formed in an external case of the projector. Therefore, when the opening is covered by a foreign material easily absorbing light, the reliability of the projector could deteriorate due to a possible temperature rise of the projector caused by the existence of the foreign material, for example.

SUMMARY

An advantage of some aspects of the invention is to provide a projector capable of preventing deterioration of its reliability.

An aspect of the invention provides a projector including: an external case provided with an opening through which light passes; a projection system disposed within an inside space of the external case, wherein the projection system includes a reflection member having a reflection surface capable of reflecting light received from a light source device to guide the light toward the opening, and projects the light to the outside of the external case via the opening; and a detection unit which detects a foreign material existing on the optical path of the light in the area of light exit of the opening.

According to the projector of the aspect of the invention, in which the light reflected by the reflection member of the projection system is projected to the outside of the external case through the opening of the external case, the projector has the detection unit for detecting a foreign material existing on the optical path of the light in the area of light exit of the opening, and therefore can determine whether a foreign material is present on the optical path or not. Therefore, when it is determined that a foreign material exists on the optical path based on the detection result obtained from the detection unit, appropriate steps can be taken for preventing temperature increase of the projector. Accordingly, deterioration of the reliability of the projector can be avoided.

The detection unit of the projector according to the aspect of the invention may include a light emitting portion which emits detection light, and a light receiving portion capable of receiving the detection light. In this case, the presence or absence of a foreign material can be determined by using the non-contact technique of this structure. Moreover, the existence of a foreign material on the optical path can be instantly detected by using the optical technique of this structure.

The detection unit of the projector according to the aspect of the invention may be disposed at least on a part of an area around the opening. According to this structure, a foreign material existing in the area of light exit of the opening can be detected in a preferable condition.

The detection unit of the projector according to the aspect may have a first detection unit disposed on one part with respect to the center of the opening, and a second detection unit disposed on the other part with respect to the center of the opening. According to this structure, widening of the detection area by the use of at least a pair of the detection units contributes to preferable detection of a foreign material.

The respective units of the detection unit of the projector according to the aspect may be disposed in the short side of the opening. According to this structure, reduction of the distance between the respective detection units as an area where detection of a foreign material is impossible contributes to preferable detection of a foreign material.

The detection unit of the projector according to the aspect may be disposed within the inside space. According to this structure, the detection light emitted from the light emitting portion disposed within the inside space travels while widening, wherefore the detection area where detection of a foreign material is possible can be enlarged. Moreover, the detection unit located within the interior of the projector is not easily affected by external dust or the like.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Figure 1:
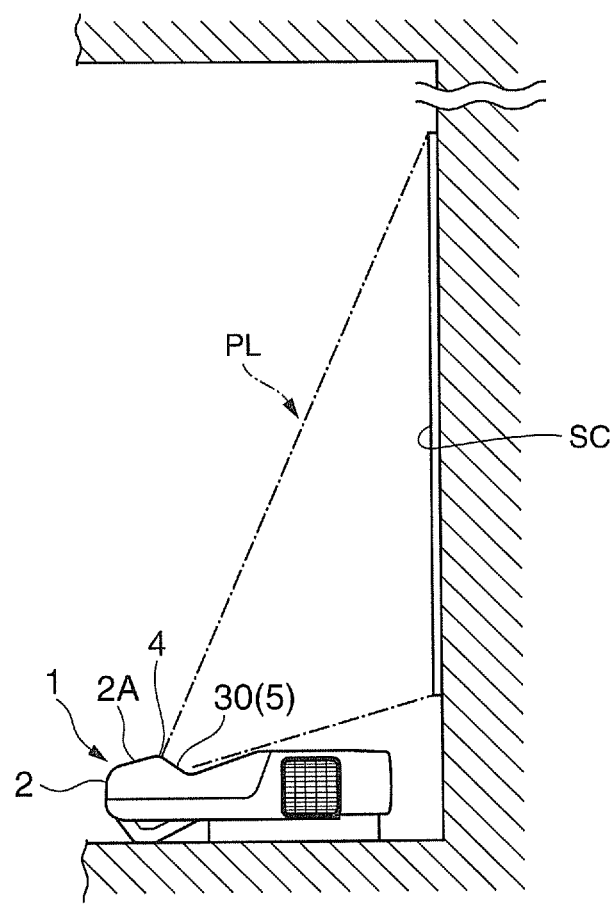
FIG. 1 illustrates an example of installation condition of a projector.
Figure 2:
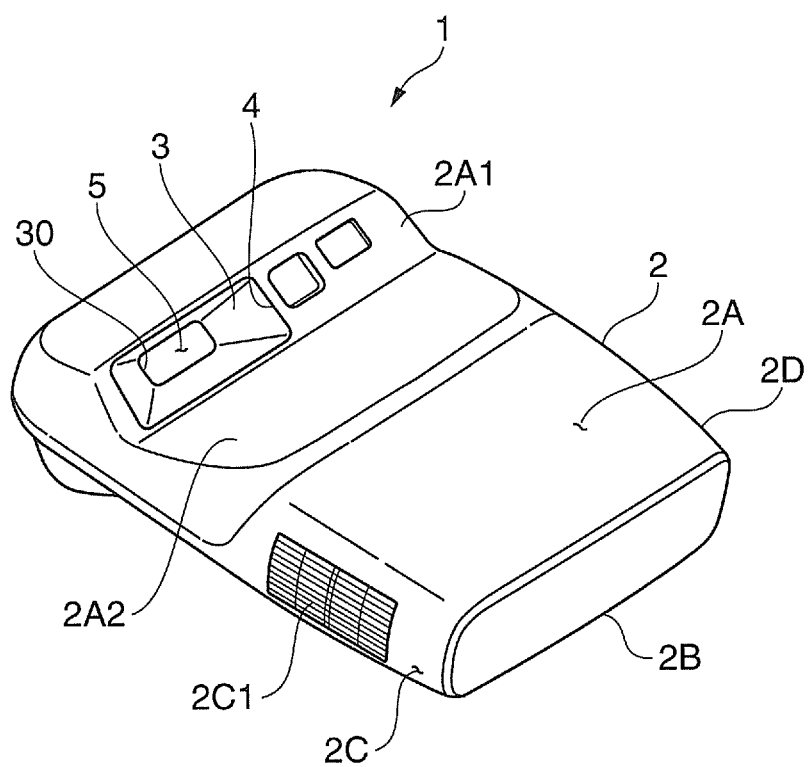
FIG. 2 is a perspective view illustrating an example of a projector according to a first embodiment.

A first embodiment according to the invention is hereinafter described with reference to the drawings. FIGS. 1 and 2 illustrate an example of a projector 1 according to this embodiment. As can be seen from FIGS. 1 and 2, the projector 1 includes an external case 2 constituting the external casing of the projector 1. The external case 2 is made of synthetic resin, for example. The external case 2 has a top surface 2A, a bottom surface 2B, a side surface 2C, and a side surface 2D. During projection of light from the projector 1, the top surface 2A may be located in any position of the projector 1, i.e., the top, bottom, or front side position of the projector 1. In this embodiment, the installation condition of the projector 1 in which the top surface 2A is located in the top position of the projector 1 will be discussed. The projector 1 applies projection light PL to a screen SC to project an image onto the screen SC.

The top surface 2A has a first inclined surface 2A1 and a second inclined surface 2A2. The first inclined surface 2A1 has a concave 3.

The top surface 2A of the external case 2 has a rectangular opening 4 and a projection opening 30 through which light passes. The opening 4 is formed at the upper end of the concave 3, whereas the projection opening 30 is formed on the bottom of the concave 3. In this embodiment, a light-transmissible member 5 capable of transmitting light is attached to the projection opening 30. A similar light-transmissible member may also be attached to the opening 4 for which the light-transmissible member 5 is not provided in this embodiment.

The side surface 2C has a slit-shaped air intake opening 2C1. An air filter and an air intake fan are equipped inside the air intake opening 2C1. The air intake fan introduces cooling air for cooling the system main body via the air intake opening 2C1 and the air filter into an inside space SP of the external case 2.

The projector 1 includes an optical unit 6 disposed within the inside space SP of the external case 2. The optical unit 6 contains a light source device, a light modulation device 61 which has a liquid crystal panel and others for modulating the light PL emitted from the light source device, a projection system 7 which projects the projection light PL received from the light modulation device 61, and other components. The optical unit 6 has a structure similar to the corresponding structures of various types of projectors generally available, except for the unique structure of the projection system 7. In the following description, therefore, the details of the projection system 7 are chiefly touched upon, and the explanation of other parts of the optical unit 6 is not specifically explained herein.

Figure 3:
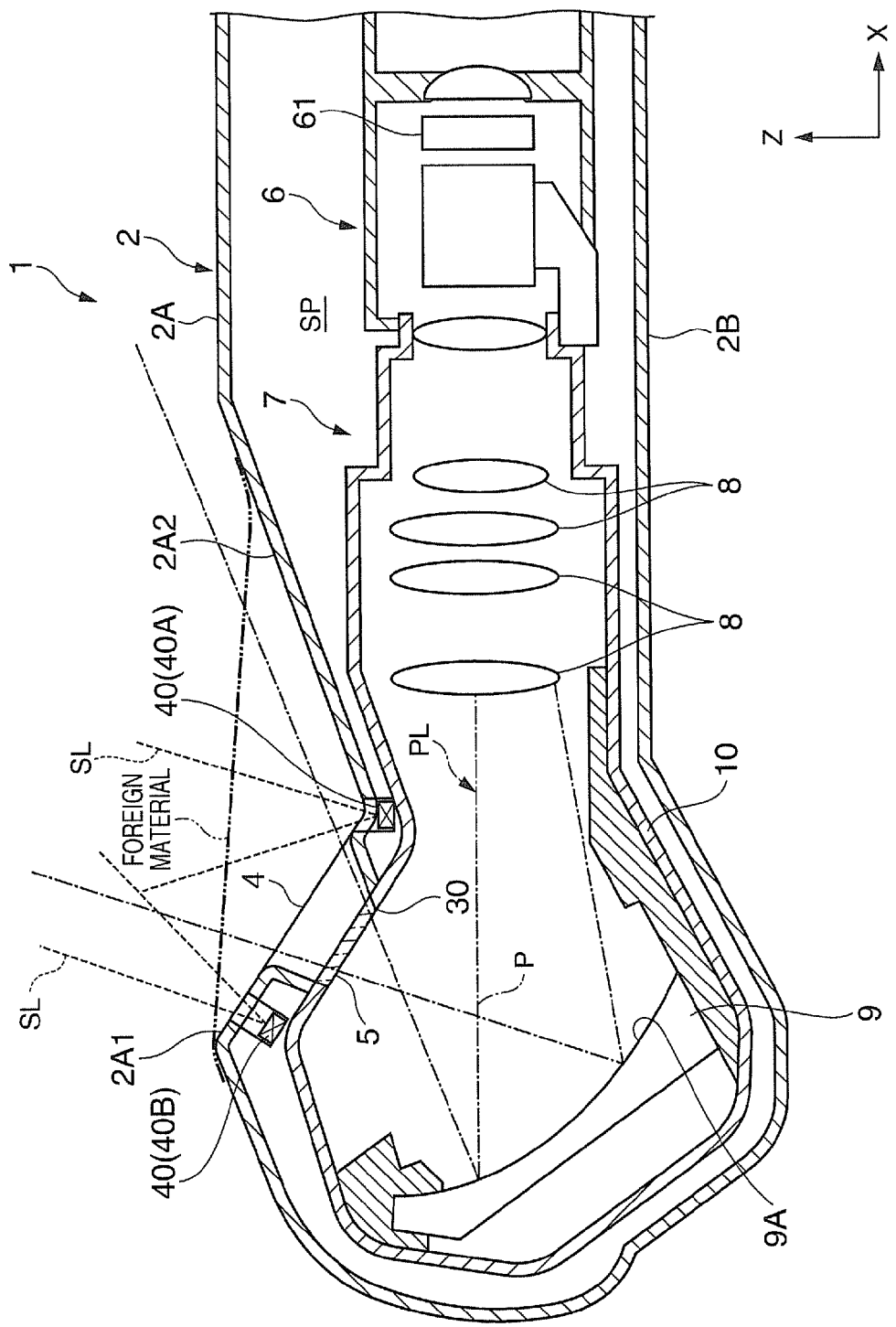
FIG. 3 illustrates a part of the projector according to the first embodiment.

FIG. 3 is a cross-sectional view schematically illustrating apart of the projection system 7. The projection system 7 includes a plurality of lenses 8 which receive the light PL emitted from the light source device and transmitted through the light modulation device 61, a reflection member 9 which has a reflection surface 9A capable of reflecting the light PL received from the lenses 8, and a housing member 10 which houses the lenses 8 and the reflection member 9.

In this embodiment, the reflection surface 9A includes a concaved surface so as to constitute an aspheric mirror of the reflection member 9. In the following description, therefore, the reflection member 9 is also referred to as the "aspheric mirror 9" in some cases.

The reflection surface 9A is a reflection surface not having a rotation-symmetric shape but having a free curved shape. In this embodiment, the aspheric mirror 9 is disposed at the most downstream location on the optical path within the projection system 7 in such a position that the reflection surface 9A faces diagonally upward. The aspheric mirror 9 reflects the light PL guided by the plural lenses 8 to fold the light PL in a diagonally upward direction and make the light PL wide-angled.

The projection opening 30 and the opening 4 are openings through which the light PL reflected by the aspheric mirror 9 passes. The projection opening 30 and the opening 4 are disposed on the upper part of the housing member 10. The projection system 7 is provided within the inside space SP of the external case 2 in such a position that the light PL reflected by the aspheric mirror 9 can pass through the projection opening 30 and the opening 4 on the upper side of the housing member 10. The aspheric mirror 9 (reflection surface 9A) reflects the light PL received from the lenses 8 to guide the light PL toward the projection opening 30 and the opening 4. The light PL coming from the reflection member 9 passes through the projection opening 30, and then through the opening 4. The light PL coming from the reflection member 9 and passing through the projection opening 30 and the opening 4 is then released toward the space outside the external case 2.

The projection opening 30 is disposed in the vicinity of a converging point P at which the light PL reflected by the reflection surface 9A of the aspheric mirror 9 converges. This position of the projection opening 30 in the vicinity of the converging point P contributes to reduction of the area of the projection opening 30 to be formed.

In this embodiment, the projector 1 includes detection units 40 having the function of detecting a foreign material existing on the optical path of the light (projection light) PL projected to the outside space of the external case 2 via the projection opening 30 (light-transmissible member 5) and the opening 4. Each of the detection units 40 detects a foreign material present on the optical path of the light PL in the area of light exit of the opening 4.

The detection units 40 in this embodiment are disposed on the external case 2. The detection units 40 have a first detection unit 40A located near the inclined surface 2A2 (one side) with respect to the center of the opening 4, and a second detection unit 40B located near the inclined surface 2A1 (the other side) with respect to the center of the opening 4, which units 40A and 40B are both disposed in the short side of the opening 4. The detection units 40 (40A and 40B) are positioned outside the optical path of the light PL in the area of light exit of the opening 4. The detection units 40A and 40B in this embodiment have the same structure.

According to this embodiment, each of the detection units 40 emits detection light SL so as to optically detect a foreign material using the detection light SL. The first detection unit 40A detects a foreign material existing on the optical path of the light PL by applying the detection light SL to the optical path of the light (projection light) PL in the outside space. The second detection unit 40B detects a foreign material existing on the inclined surface 2A1. The detection light SL applied by the second detection unit 40B may be designed either to reach or not to reach the optical path of the light PL.

Examples of the foreign material addressed herein include paper, a sheet of materials, and others. It is expected that this type of foreign material has a relatively long shape for the configuration of the opening 4. In this case, the foreign material extends throughout the space between the inclined surface 2A1 and the inclined surface 2A2 as illustrated in FIG. 3. According to this embodiment, the detection unit 40B disposed on the inclined surface 2A1 can detect the existence of the foreign material extending throughout the space between the inclined surface 2A1 and the inclined surface 2A2.

Figure 4:
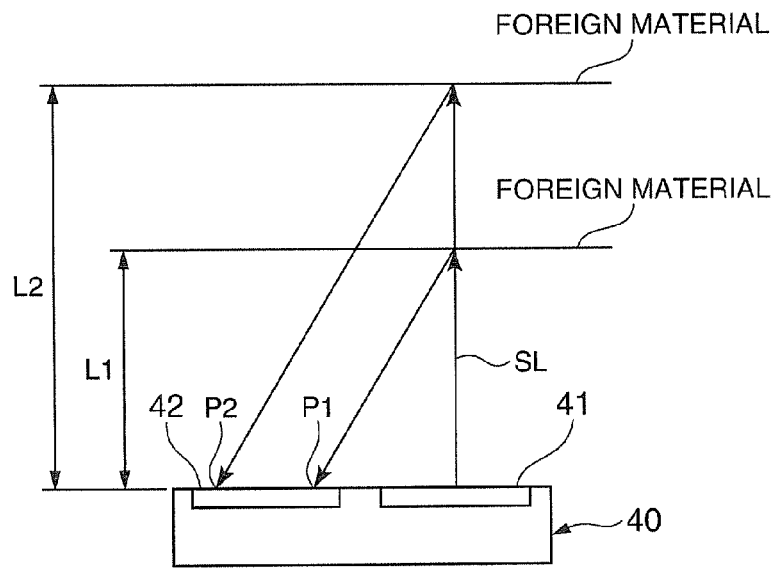
FIG. 4 illustrates an example of a detection unit according to the first embodiment.

FIG. 4 illustrates an example of the detection units 40. Each of the detection units 40 includes a light emitting portion 41 which emits the detection light SL, and a light receiving portion 42 which receives the detection light SL. The light emitting portion 41 and the light receiving portion 42 are disposed side by side.

In this embodiment, each of the detection units 40 is constituted by an infrared reflection type optical sensor. This type of the detection unit 40 emits infrared light as the detection light SL.

When a foreign material exists on the optical path of the detection light SL, the detection light SL emitted from the light emitting portion 41 reaches the foreign material. At least a part of the detection light SL applied to the foreign material is reflected by the foreign material. At least a part of the detection light SL reflected by the foreign material reaches the light receiving portion 42. The light receiving portion 42 receives the detection light SL from the foreign material. When no foreign material exists on the optical path of the detection light SL, the detection light SL emitted from the light emitting portion 41 is not received by the light receiving portion 42. According to this mechanism, whether a foreign material exists on the optical path of the light PL or not can be detected by the detection units 40 based on the determination whether the detection light SL emitted from the light emitting portion 41 is received by the light receiving portion 42 or not.

In this embodiment, each of the detection units 40 can detect not only the presence or absence of a foreign material, but also can measure the distance between the light receiving portion 42 and a foreign material. More specifically, each of the detection units 40 determines the distance between the light receiving portion 42 and the foreign material based on the arrival position of the detection light SL on the light receiving portion 42.

For example, when the distance between the light receiving portion 42 and the foreign material is a first distance L1 as illustrated in FIG. 4, the detection light SL emitted from the light emitting portion 41 and reflected by the foreign material reaches a first position P1 on the light receiving portion 42. On the other hand, when the distance between the light receiving portion 42 and the foreign material is a second distance L2 longer than the first distance L1, the detection light SL emitted from the light emitting portion 41 and reflected by the foreign material reaches a second position P2 on the light receiving portion 42 as a position different from the first position P1.

It should be noted that each of the detection units 40 may also detect the distance between the light receiving portion 42 and the foreign material based on the illuminance distribution of the detection light SL applied to the light receiving portion 42.

As explained above, there is a high possibility that the foreign material such as paper and a sheet of materials is positioned on the top surface 2A in such a manner as to cover the opening 4. When the projection light PL is released through the opening 4 under this condition, the temperature of the space between the foreign material and the outer surface (top surface 2A) of the external case 2 may rise, for example. In this case, the temperature of the projector 1 increases, which could result in deterioration of the reliability of the projector 1, for example.

According to this embodiment, however, the detection units 40 capable of detecting a foreign material on the optical path of the projection light PL released through the opening 4 can determine whether a foreign material exists on the optical path. Therefore, when it is determined that a foreign material exists on the optical path based on the detection result obtained from the detection units 40, the projector 1 can take appropriate steps for preventing temperature increase of the projector 1. For example, the projector 1 may provide warning display or other notifications. Accordingly, the reliability of the projector 1 does not deteriorate.

In this embodiment, each of the detection units 40 detects the presence or absence of a foreign material using an optical technique (non-contact technique). Thus, a foreign material present on the optical path of the projection light PL can be instantly detected by this technique. In other words, the foreign material existing on the optical path, for example, can be detected without delay before an excessive rise of the temperature of the projector 1.

Moreover, the light (projection light) PL coming from the lenses 8 travels within the X-Z plane as illustrated in FIG. 3. Similarly, the detection light SL emitted from the light emitting portion 41 travels within the X-Z plane. According to this structure, the detection units 40 can detect the presence or absence of a foreign material on the optical path of the light PL with high accuracy.

Figure 5:
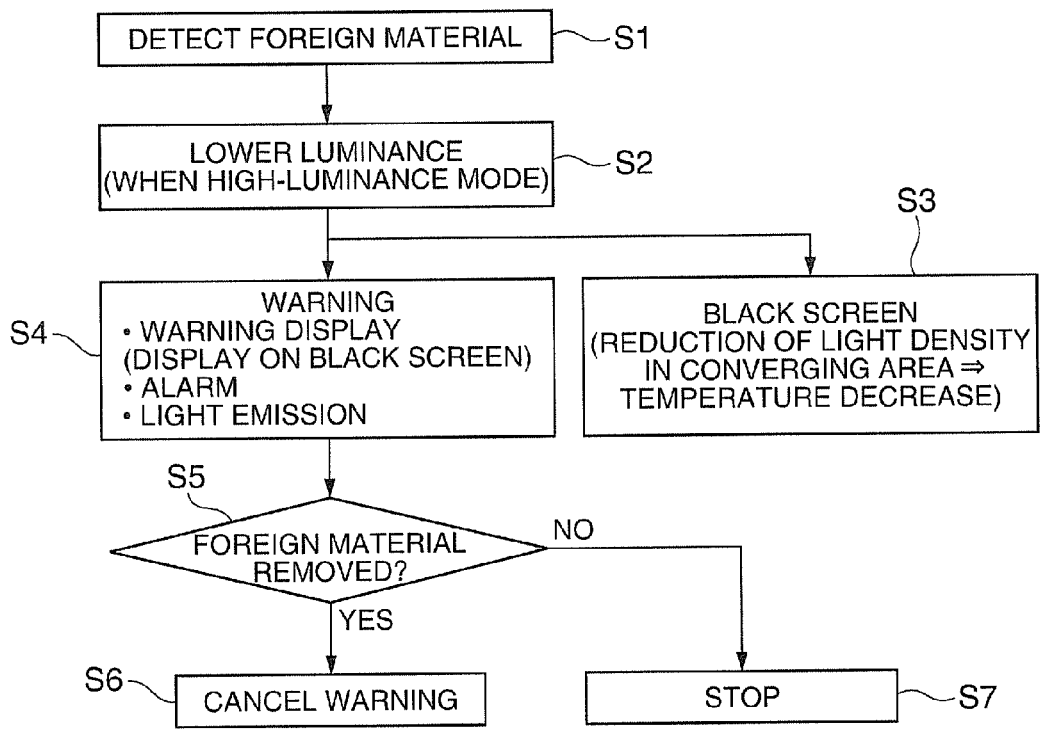
FIG. 5 illustrates an example of an operation performed by the projector according to the first embodiment.

An example of the operation performed by the projector 1 when a foreign material has been detected by the function of the detection units 40 is now explained. When a foreign material is detected by the detection units 40 under the condition in which the projection light PL is being emitted from the projector 1 in a high-luminance mode (step S1) as shown in a flowchart in FIG. 5, the high-luminance mode is switched to a low-luminance mode by reduction of the luminance of the light source device (reduction of the output and the light intensity of the light source device) (step S2).

Then, the projector 1 displays a black screen (step S3). Simultaneously with the action of blackening the screen display, the projector 1 issues warning (step S4). The warning provided at this step may be a warning display on the black screen, for example. Alternatively, the warning may be generated by an alarm (such as a buzzer), or by a light emitter (such as an LED) when equipped on the projector 1.

The warning thus issued notifies the user of the projector 1 that the foreign material currently exists. Based on this notification, the user can remove the foreign material to avoid temperature increase of the projector 1.

After an elapse of a predetermined time from emission of the warning, the projector 1 determines whether the foreign material has been removed using the detection units 40 (step S5). When it is determined that the foreign material has been removed in response to the warning, for example, the projector 1 cancels issue of the warning (step S6). After removal of the foreign material, the projector 1 stops display of the black screen and returns to the high-luminance mode.

When the foreign material is not removed even under emission of the warning, the projector 1 suspends the operation of the light source device after an elapse of a predetermined time from generation of the warning (step S7).

According to this embodiment, a pair of the detection units 40A and 40B are provided around the opening 4. However, the detection units 40 to be equipped are not limited to a pair of units but may be only a single unit. For example, such an arrangement is allowed in which only the first detection unit 40A is provided, eliminating the second detection unit 40B. In the case of the detection unit 40 constituted by only one unit, the detection unit 40 may be disposed at least on a part (an arbitrary position) of the area around the opening 4.

The detection units 40 provided around the opening 4 may be two or more units. For example, three or more units of the detection units 40 may be equipped around the opening 4. When the plural detection units 40 are provided, it is only required that at least one of the detection units 40 supplies the detection light SL reaching the optical path of the light PL. In this case, the other units of the detection units 40 may only detect a foreign material existing around the opening 4.

The first detection unit 40A and the second detection unit 40B disposed in the short side of the projection opening 30 in this embodiment may be positioned in the long side of the projection opening 30.

Second Embodiment

A second embodiment according to the invention is now described. In the following description, the constitutions and parts identical or similar to the corresponding constitutions and parts in the first embodiment have been given similar reference numbers, and the same explanation associated therewith is simplified or not repeated.

Figure 6:
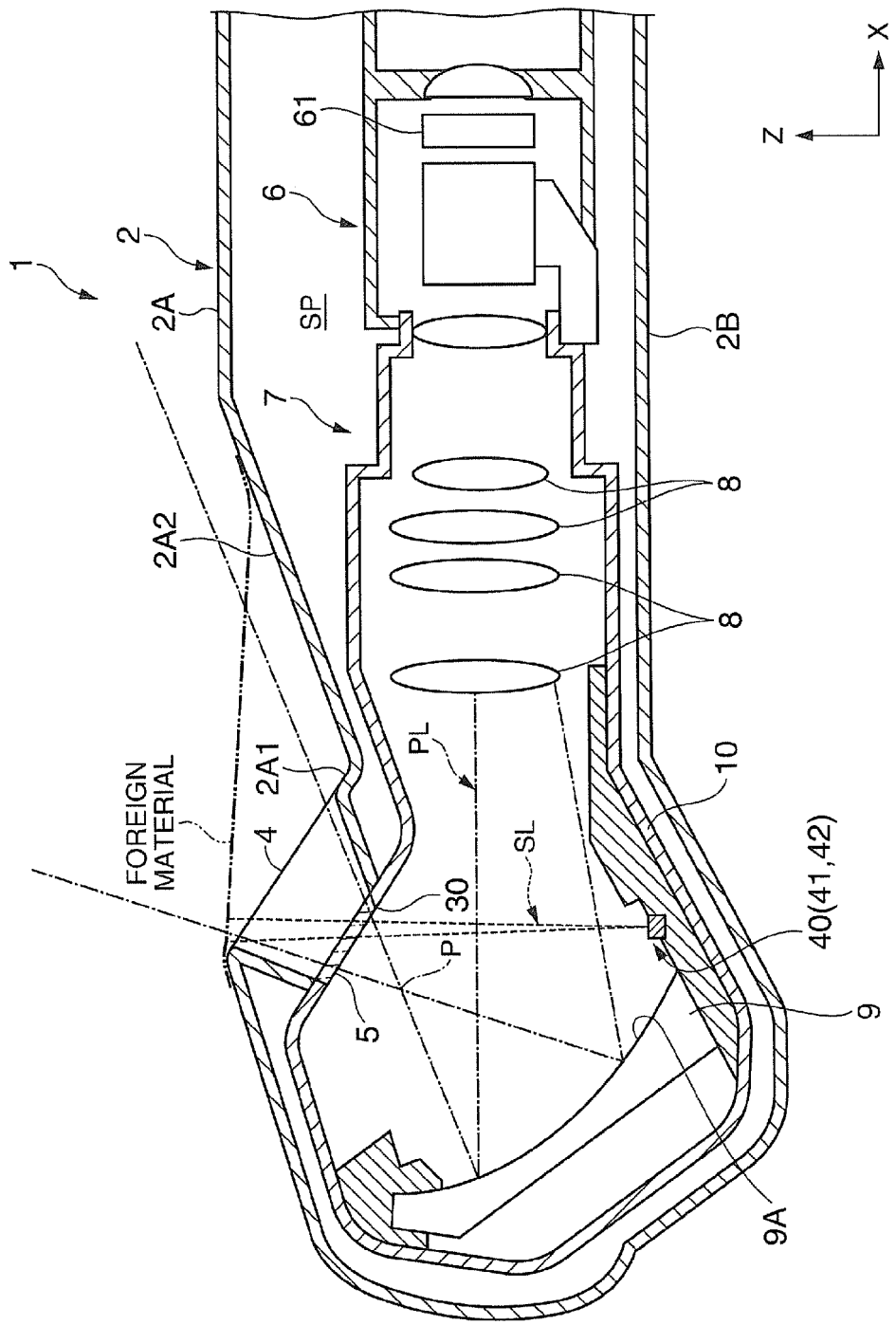
FIG. 6 illustrates a part of a projector according to a second embodiment.

FIG. 6 illustrates an example of the projector 1 according to the second embodiment. In this embodiment, the detection unit 40 is included in the projection system 7 within the inside space SP. The detection unit 40 is disposed outside the optical path of the light PL within the inside space SP. The detection unit 40 in this embodiment is located in such a position as to face to the optical path of the light PL between the lenses 8 and the aspheric mirror 9.

According to this embodiment, the detection unit 40 applies the detection light SL via the projection opening 30 (light-transmissible member 5) to the optical path of the light (projection light) PL in the area of light exit of the opening 4 so as to detect a foreign material existing on the optical path of the light PL.

When a foreign material is present on the optical path of the light PL, the detection light SL emitted from the light emitting portion 41 passes through the projection opening 30 (light-transmissible member 5) and reaches this foreign material. In this case, at least a part of the detection light SL applied to the foreign material is reflected by the foreign material. At least a part of the detection light SL reflected by the foreign material then passes through the projection opening 30 (light-transmissible members) and reaches the light receiving portion 42. The light receiving portion 42 receives the detection light SL coming from the foreign material.

When no foreign material exists on the optical path of the light PL, the detection light SL emitted from the light emitting portion 41 is released toward the outside space via the projection opening 30 (light-transmissible member 5). This detection light SL is not received by the light receiving portion 42.

According to this embodiment, the detection unit 40 is included in the projection system 7 within the inside space SP and disposed away from the opening 4. Therefore, a sufficient distance is secured between the opening 4 and the detection unit 40, in which condition the detection light SL emitted from the detection unit 40 travels toward the opening 4 while widening, allowing only one unit of the detection unit 40 to perform detection throughout a wide area. Moreover, the detection unit 40 located within the interior of the projector 1 is not easily affected by external dust or the like.

In this embodiment, the emission direction of the detection light SL from the light emitting portion 41 is substantially perpendicular to the surface on which the projector 1 is installed. However, the emission direction of the detection light SL from the light emitting portion 41 may be any direction as long as the angle of the detection light SL with respect to the normal line of the installation surface lies within the range of ±45 degrees.

According to this embodiment, in FIG. 6, the light (projection light) PL coming from the lenses 8 travels within the X-Z plane. The detection light SL coming from the light emitting portion 41 also travels within the X-Z plane. Thus, the presence or absence of a foreign material on the optical path of the light PL can be detected with high accuracy.

Figure 7:
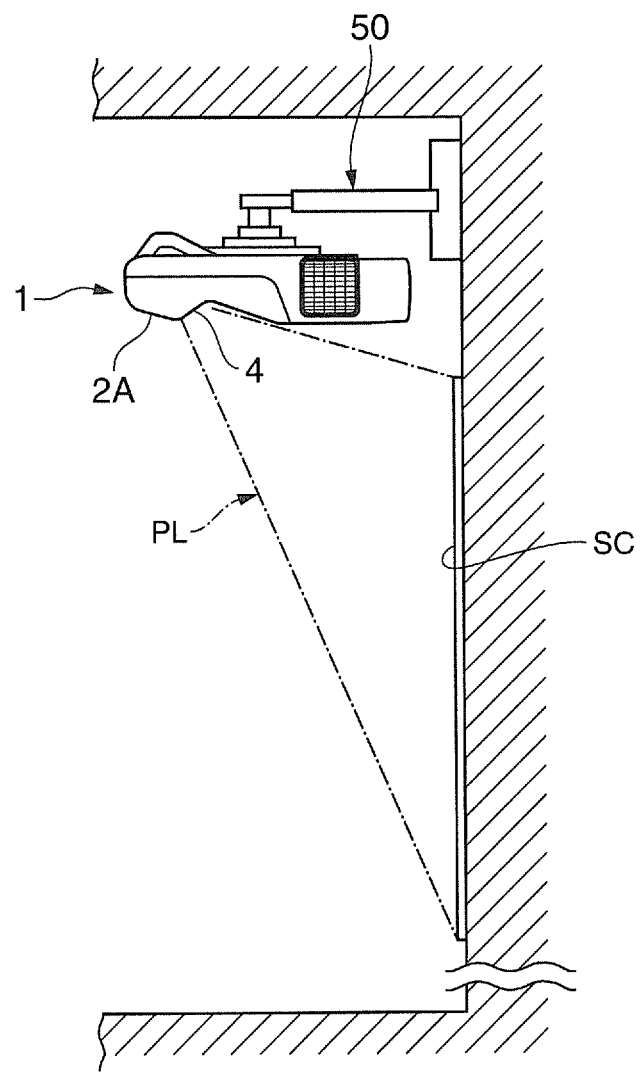
FIG. 7 illustrates an example of installation condition of a projector.

According to the first and second embodiments, the projector 1 is positioned with the top surface 2A (projection opening 30) located in the top position during use. However, the top surface 2A may be located in the bottom position for use as illustrated in FIG. 7. In the case of the arrangement shown in FIG. 7, the projector 1 is supported by a support mechanism 50 in such a condition that the top surface 2A (opening 4) faces downward.

According to the first and second embodiments, the detection unit(s) 40 emit the detection light SL to optically detect a foreign material. However, detection of a foreign material may be achieved by using a detection device generating ultrasonic waves, or a detection device capable of capturing images for detection.

The entire disclosure of Japanese Patent Application No. 2011-126118, filed Jun. 6, 2011 is expressly incorporated by reference herein.

What is claimed is:

1. A projector comprising:
   an external case provided with an opening through which light passes;
   a projection system disposed within an inside space of the external case, wherein the projection system includes a reflection member having a reflection surface capable of reflecting light received from a light source device to guide the light toward the opening, and projects the light to the outside of the external case via the opening; and
   a detection unit which detects a foreign material existing on the optical path of the light in an area of a light exit of the opening by detecting light directly reflected from the foreign material.

2. The projector according to claim 1, wherein the detection unit includes a light emitting portion which emits detection light, and a light receiving portion capable of receiving the detection light.

3. The projector according to claim 1, wherein the detection unit is disposed at least on a part of an area around the opening.

4. The projector according to claim 1, wherein the opening is a rectangle; and the detection unit has a first detection unit disposed on one side with respect to the center of the opening, and a second detection unit disposed on an other side with respect to the center of the opening.

5. The projector according to claim 4, wherein the respective units of the detection unit are disposed in a short side of the opening.

6. The projector according to claim 1, wherein the detection unit is disposed within the projection system.

7. The projector according to claim 1, wherein the detection unit detects the foreign material which has a relatively long shape for the opening and exists on or above the external case.

8. The projector according to claim 2, wherein the projection system includes a plurality of lenses receiving the light emitted from the light source; and the light coming from the plurality of lenses and the detection light travel within a same plane in a cross sectional view.

9. The projector according to claim 2, wherein the detection unit determines a distance between the light receiving portion and the foreign material.

* * * * *